Dec. 15, 1936.   G. HAMMOND   2,064,661
PIPE CUTTER
Filed April 23, 1935
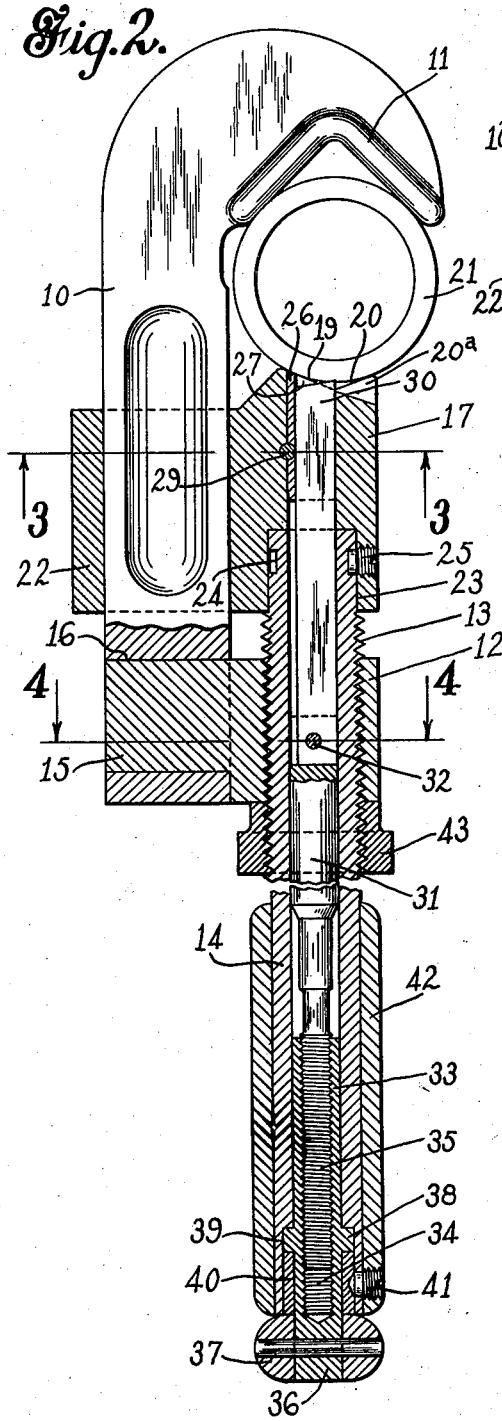
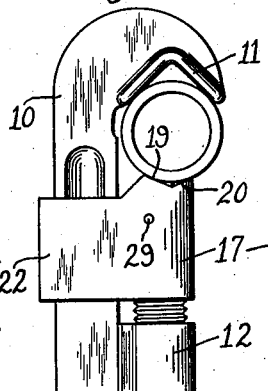
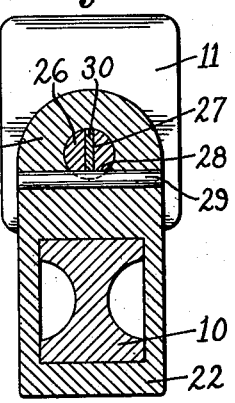
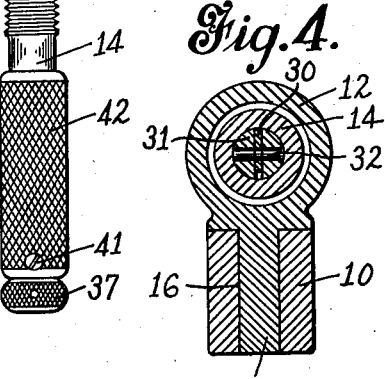
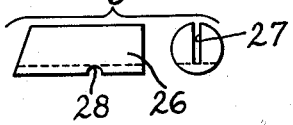
Inventor
Grant Hammond
By Rockwell & Bartholow
Attorneys Patented Dec. 15, 1936

2,064,661

UNITED STATES PATENT OFFICE 2,064,661

PIPE CUTTER

Grant Hammond, Hamden, Conn., assignor to The Barnes Tool Company, New Haven, Conn., a corporation of Connecticut Application April 23, 1935, Serial No. 17,803

2 Claims. (Cl. 81—192)

The present invention relates to cutting tools for pipes or bars, and more particularly to a tool of this character using a blade-typecutter instead of the wheel or disk cutter usually employed in tools of this character.

A pipe or rod cutter employing a cutting blade should also be provided with cooperating jaws to engage the exterior surface of the pipe so that the tool will be held in proper relation to the work during the cutting operation. These jaws should, of course, be relatively adjustable to provide for the use of the tool with pipes of various sizes, and it is also necessary to provide for the proper adjustment of the cutter relatively to the jaws so that when the jaws engage the surface of the work, the cutter may be fed into the work as the cut is made in order to completely sever the pipe or rod which is being cut.

It is advantageous to dispose the cutter in the movable jaw and it is therefore desirable to provide for the cutter to be moved to and from the work with this jaw, and in addition, to have a feeding movement relatively to the jaw so that it can be fed into the work.

One object of the invention is to provide an efficient and serviceable tool of the type described.

Another object of the invention is to provide an efficient and serviceable pipe or rod cutter of the type described which may be manufactured at a relatively low cost.

Another object of the invention is the provision of a blade-type pipe or rod cutter which may be manufactured at a relatively low cost and which will be provided with means for holding the cutter in proper relation to the work so that a true and accurate cut may be made.

A still further object of the invention is the provision of a blade-type pipe or rod cutter provided with relatively stationary and movable jaws, with the cutter provided in the movable jaw, and the cutter itself being adjustably mounted so that it may be fed into the work and at the same time may be moved forwardly as it is used so that it may be resharpened and render a long period of service.

To these and other ends, the invention consists in the novel features and combinations of parts to be hereinafter described and claimed.

In the drawing:

Fig. 1 is a side elevational view of a pipe or rod cutter embodying my improvements;

Fig. 2 is a longitudinal sectional view of the working parts of the tool shown in Fig. 1;

Fig. 3 is a sectional view on line 3—3 of Fig. 2;

Fig. 4 is a sectional view on line 4—4 of Fig. 2;

Fig. 5 represents side and end elevational views of the cutter-holding cheek.

In the illustration of one preferred embodiment of my invention, I have shown a pipe cutter having a body portion or stock 10 provided with a jaw 11 at one end. At its other end the stock is provided with a hollow bracket 12 which is internally threaded to receive the threaded portion 13 of the adjusting handle member 14. The bracket 12 may be secured to the stock by the provision of a lug 15 secured to the bracket and set into an opening 16 in the stock.

A cooperating jaw member 17 having jaw portions 19 and 20 which cooperate with the jaw 11 to hold the work 21 is movably mounted relatively to the stock 10. To effect this end, the jaw member 17 may be provided with a U-shaped or stirrup-shaped portion 22 which embraces the stock and slides thereon, so that the jaw member will be accurately guided for sliding movement on the stock but will be held in proper relation to the fixed jaw 11. In the jaw 20 is provided a chip clearance cut 20ª to permit the escape of the chips which are cut from the work.

The forward end of the handle member 14 extends within a bore 23 of the jaw member 17 and is provided with an annular groove 24 which receives the end of a setscrew 2 secured in the jaw member 17, so that the handle member 14 is secured to the jaw but permitted to rotate relatively thereto. It will be apparent that when the handle member 14 is turned it will be moved longitudinally through the threaded bracket 12 and will thus move the jaw slidably upon the stock 10 relatively to the jaw 11 in order that the space between the cooperating jaws may be adjusted to the pipe or rod which it is desired to cut.

The jaw member 17 has an opening therethrough and within this opening is mounted a cheek piece 26, shown in Fig. 5, having a slot 27 therein to receive the cutting blade, as will be hereinafter explained. The cheek piece 26 is provided at its lower side with a semicircular recess 28, and a corresponding recess is provided in the surface of the bore in the member 17 to provide an opening to receive a pin 29 to secure the cheek against rotation within the member 17. The pin, of course, also secures the cheek against any longitudinal movement within this member.

The handle member 14 is likewise hollow and the bore of this member is in alignment with the bore in the member 17 in which the cheek piece 26 is mounted. A cutting blade 30 in the form of a narrow flat member is mounted within the member 17 and forward end of the handle 14 and is received within the slot 27 in the cheek piece 26. This blade or cutter is of a size to make a relatively close sliding fit within the slot 27, so that the cutter is held against lateral or rotational movements by its engagement within this slot.

The cutter may be of any appropriate length in order to provide a sufficient period of service and extends rearwardly into the forward end of the handle 14. To the rear end of the cutter is secured a rod 31, the connection being made by the provision of a slot in the forward end of this rod which receives the rear end of the cutter, and a pin 32 may be passed through the walls of the slot and the rear end of the cutter. It will be understood that the rod 31 is disposed within the handle member 14, and while it is slidably mounted within the handle, it will be held against rotation therein by its connection with the cutter 30, which in turn is held against rotation by the cheek piece 26.

Also mounted within the hollow handle 14 is an adjusting sleeve 33 internally threaded, as at 34, to receive the threaded reduced end 35 of the rod 31. The sleeve 33 is rotatably mounted within the handle and has an extended end 36 projecting from the handle, upon which may be mounted an adjusting button or finger piece 37.

The sleeve 33 may be rotatably held within the handle member 14 in a convenient way by providing this sleeve with an external annular rib or shoulder 38 which may be received in an enlarged portion 39 of the bore of the handle member. A sleeve 40 is mounted in the enlarged portion of the bore in the handle member back of the annular rib 38 to hold the latter in place, the collar 40 being held in position by a setscrew 41 passing through the wall of the handle member 14 and having its end engaged in the sleeve.

Upon the lower end of the handle 14 there may be provided a tubular grip 42 which surrounds the handle and is knurled upon its outer surface, so that the operator may secure a good grip thereon in manipulating the tool. The screw 41 passes through the wall of this grip member and is threaded therein, so that this member holds the grip member 42 in place as well as the collar 40.

A lock nut 43 is threaded upon the threaded portion 13 of the handle 14 so that it may be set up against the bracket member 12 to prevent rotation of the handle 14 after the jaws have been clamped upon the work. It may also be stated at this point that the sleeve 33 and the threaded portion of the rod 31 are preferably provided with left-hand threads, so that turning the button 37 to the right will advance the rod 31 and feed the cutter into the work.

The operation of the device is as follows:

When it is desired to apply the tool to a pipe or rod to cut the same in two, the grip member 42 may be rotated to the left to withdraw the jaw member 17 from the jaw 11 in case the opening between the jaws is not sufficiently wide to take the pipe. When the cutter has been applied to the pipe, the grip member 42 is rotated in the opposite direction, or, to the right. It will be understood that the rotation of the grip member 42 also rotates the hollow handle member 14 so as to cause the threaded portion 13 of this handle to advance in the internally threaded bracket 12, which will move the jaw member 17 toward the jaw 11 until the work is clamped tightly between the jaw 11 and the jaw portions 19 and 20 on the member 17. During this operation the hollow handle member 14 rotates within the jaw member 17, the latter, of course, being held against rotation, this movement being permitted by the engagement of the set screw 25 within the slot 24. Also, the cutter or blade 30 will be held against rotation by the cheek member 26, and the rod 31 and internally threaded sleeve 33 will likewise be held against rotation, the handle member 14 rotating upon these parts. The cutter 30 will be carried forwardly with the jaw member 17 but will not move relatively to this member.

When the jaws have been set up against the pipe, the lock nut 43 may be turned up against the bracket 12 to prevent any accidental rotation of the handle member 14 which might take place during the pipe cutting operation and which would withdraw the jaw member 17 from tight engagement with the pipe.

The button or manually operable member 37 may be rotated to set the cutter against the work. When this has been done, the tool is rotated about the pipe by means of the grip member 42 on the handle, and as the cut is made about the periphery of the pipe, the button 37 is again rotated to feed the cutter into the work, and continued operation of the tool severs the work into two parts. It will be understood that while the tool is shown as operating upon a pipe, it may be employed to cut rods as well.

While I have shown and described a preferred embodiment of my invention, it will be understood that it is not to be limited to all of the details shown, but is capable of modification and variation within the spirit of the invention and within the scope of the appended claims.

What I claim is:

1. A pipe cutter comprising a stock having a jaw member upon one end thereof and being apertured adjacent its other end, an internally threaded bracket having a lug extending therefrom and into said aperture, a second jaw member slidably mounted upon the stock between its ends, said second jaw member being hollow, a hollow handle member threadedly engaged with said bracket and rotatably secured to the hollow jaw member whereby the bracket, the stock, and the second jaw member are maintained in assembled relation, a blade-like cutter mounted within the hollow jaw member for sliding movement therein, a rod secured in the handle member and connected to the cutter, and means for advancing and retracting said rod.

2. A pipe cutter comprising a stock having a jaw member upon one end thereof and being apertured adjacent its other end, an internally threaded bracket having a lug extending therefrom and into said aperture, a second jaw member slidably mounted upon the stock between its ends, said second jaw member being hollow, a hollow handle member threadedly engaged with said bracket and rotatably secured to the hollow jaw member whereby the bracket, the stock, and the second jaw member are maintained in assembled relation, a rod slidably mounted in the handle member, a blade-like cutter secured to one end of said rod, said cutter being disposed within the hollow jaw member and projecting therefrom at the forward end thereof, a cheek member rigidly secured within the hollow jaw member adjacent its forward end and having a slot therein to slidably receive the cutter to hold the latter against rotation, means for moving the cutter and the jaw within which it is disposed toward the cooperation jaw, and means mounted within the handle member for moving said rod longitudinally within the handle member to adjust the cutter relatively to the jaw and cheek member within which it is mounted.

GRANT HAMMOND.